(12) United States Patent
Owens

(10) Patent No.: US 6,929,268 B1
(45) Date of Patent: Aug. 16, 2005

(54) AUDIO MIXING CONSOLE FLIGHT CASE

(76) Inventor: Otis Owens, 256 S. Robertson Blvd., Beverly Hills, CA (US) 90211

(*) Notice: Subject to any disclaimer, the term of this patent is extended or adjusted under 35 U.S.C. 154(b) by 232 days.

(21) Appl. No.: 10/459,832

(22) Filed: Jun. 11, 2003

(51) Int. Cl.⁷ ................................................ B62B 1/00
(52) U.S. Cl. ..................... 280/37; 190/18 A; 84/DIG. 3
(58) Field of Search .............................. 280/37, 47.34, 280/79.11; 190/18 A, 29, 30; 312/21, 22, 312/216, 249.8, 249.9, 351.3, 351.4, 351.9, 312/351.11, 351.12, 351.13; 206/314, 736, 206/738, 754, 765; 84/80, 177, DIG. 17, 84/DIG. 3; D3/272; 414/332, 416.09; 496/308, 496/310

(56) References Cited

U.S. PATENT DOCUMENTS

| | | | | |
|---|---|---|---|---|
| 2,944,862 A | * | 7/1960 | Heil ............................ | 312/237 |
| 2,974,555 A | * | 3/1961 | Andersen ..................... | 84/733 |
| 3,186,780 A | * | 6/1965 | Schaerf ........................ | 312/30 |
| 3,208,409 A | * | 9/1965 | Gale ..................... | 108/158.11 |
| 4,122,924 A | * | 10/1978 | Wasserman ............... | 190/18 A |
| 4,380,947 A | * | 4/1983 | Nishimoto ................... | 84/176 |
| D269,480 S | * | 6/1983 | Peterson et al. ............. | D3/204 |
| 4,641,565 A | * | 2/1987 | Tachida et al. ............... | 84/437 |
| 5,396,398 A | * | 3/1995 | Gill ............................ | 361/679 |
| 5,553,692 A | * | 9/1996 | Sheiman ................... | 190/18 A |
| 5,762,168 A | * | 6/1998 | Miyoshi ................... | 190/18 A |
| 6,068,355 A | * | 5/2000 | Thorp ........................ | 312/241 |
| 6,371,495 B2 | * | 4/2002 | Thompson ................... | 280/30 |

* cited by examiner

Primary Examiner—Christopher Bottorff
(74) Attorney, Agent, or Firm—Albert O. Cota

(57) ABSTRACT

A flight case (24) for shipping and supporting an audio mixing console (26), having a main platform frame (28) that includes a pair of collapsible legs (30) each with reversible swivel casters (36) and a plurality of upright sockets having gas springs (48). When the flight case (24) is positioned on its side for transportation the casters (36) face outward; when positioned horizontally the casters (36) are rotated downward for resting on a hard surface. A sub frame (50) is located inside the frame (28) and is configured to receive the audio mixing console (26). A removable top (54), with side casters (56) and locking mechanisms (58) is placed over the frame (50). When the locking mechanisms are rotated, the frame (50) and the top (54) are elevated by the gas springs (48), permitting the top (54) to be removed leaving the frame (50) for supporting the audio mixing console (26) exposed ready for use. The frame (50) is then pulled outward forming a shelf creating room for a sound engineers legs.

17 Claims, 6 Drawing Sheets

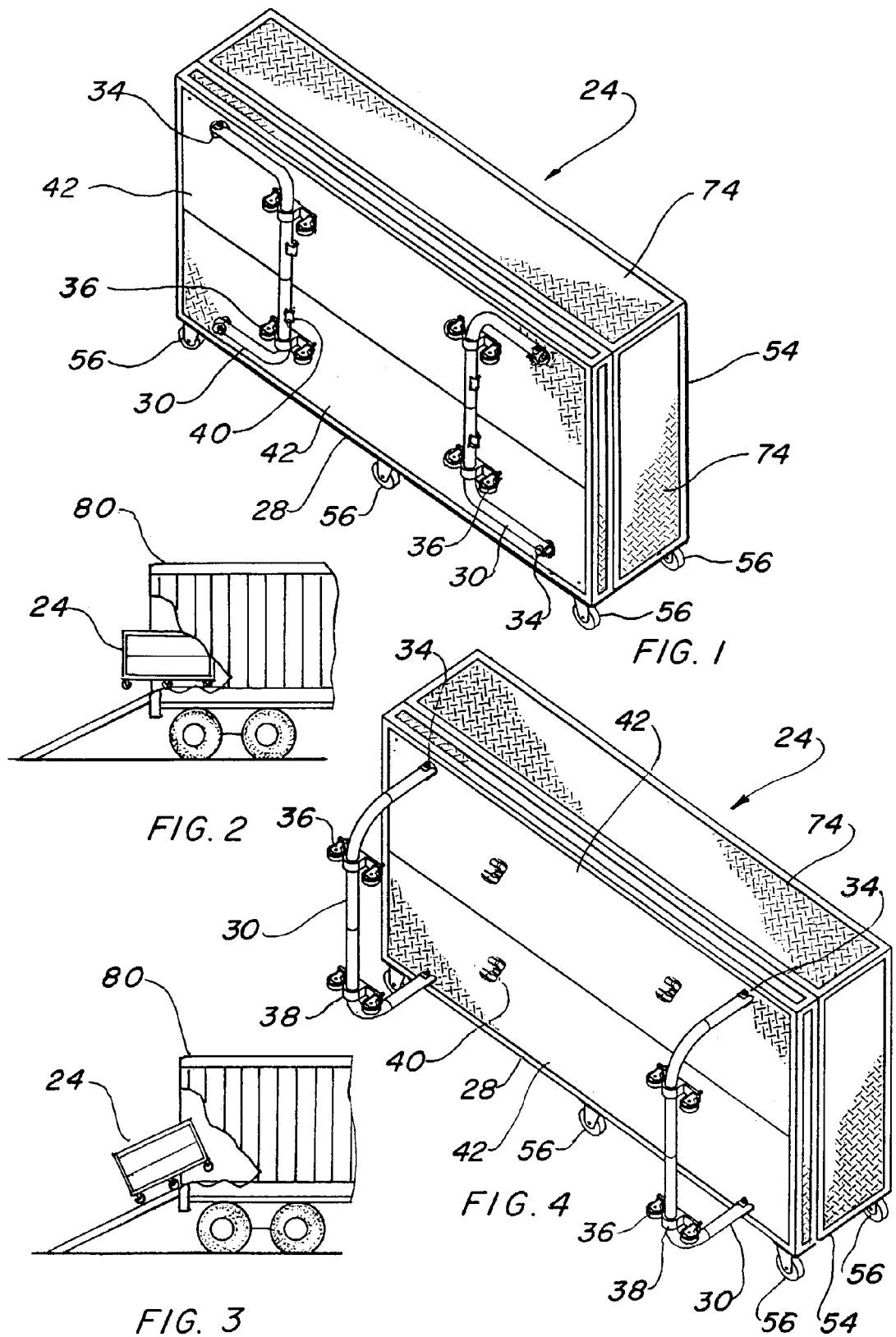

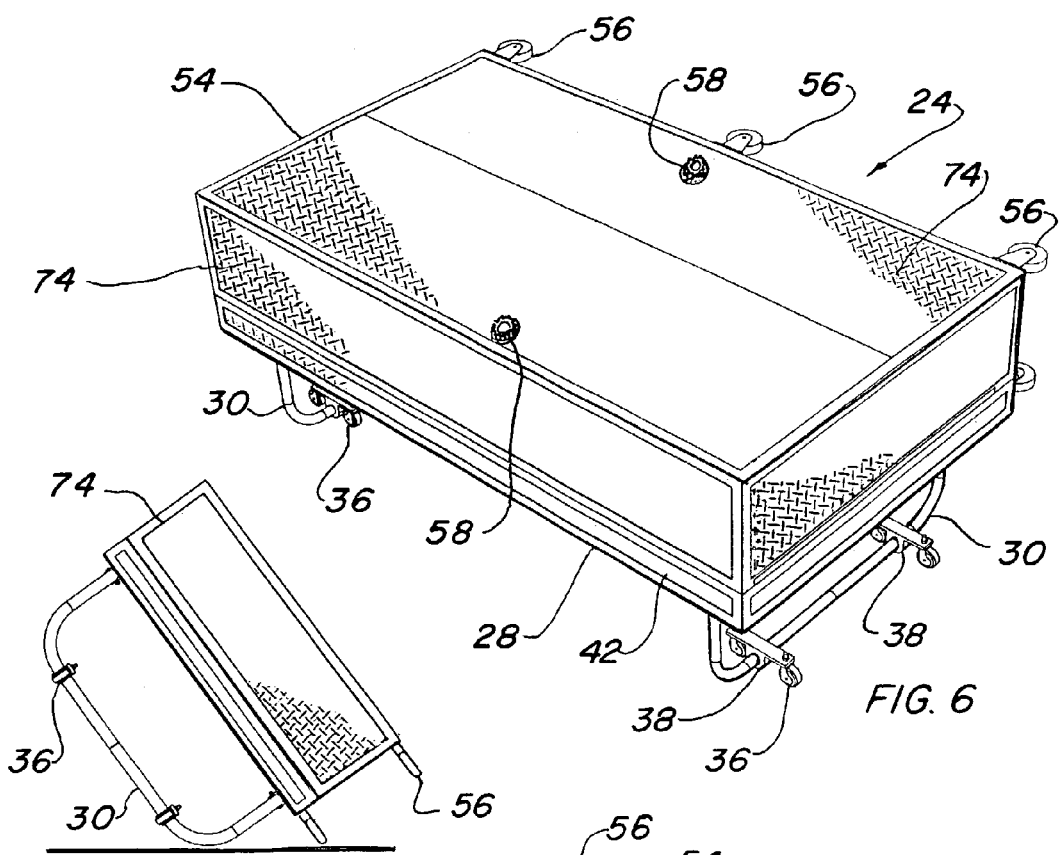
FIG. 5
FIG. 6
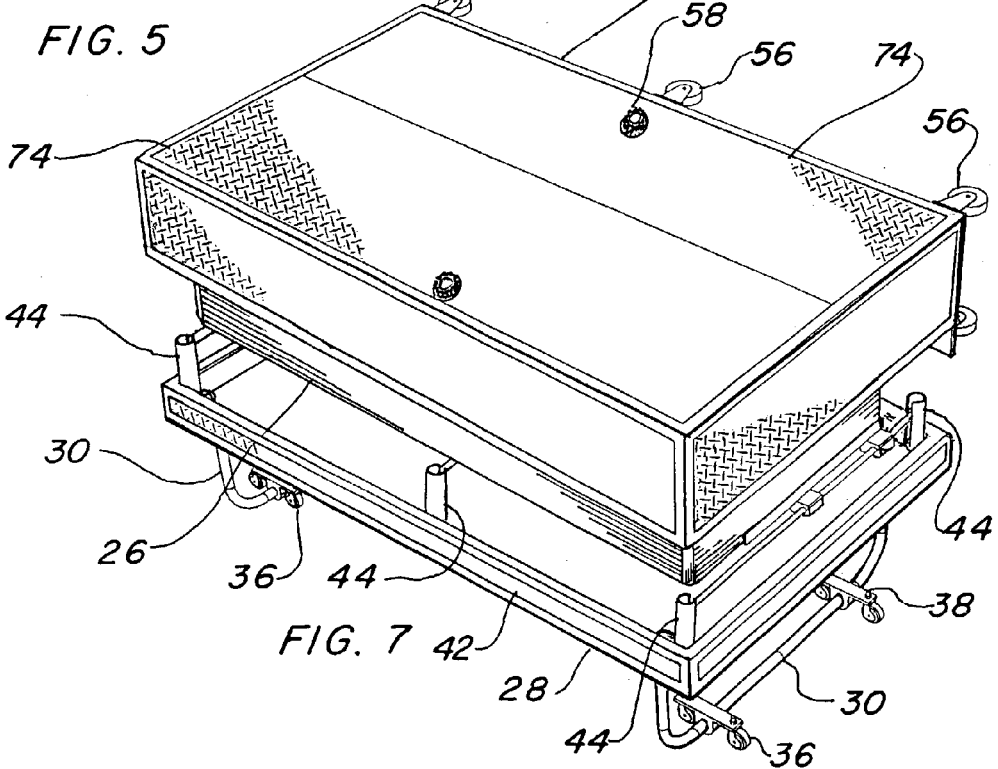
FIG. 7

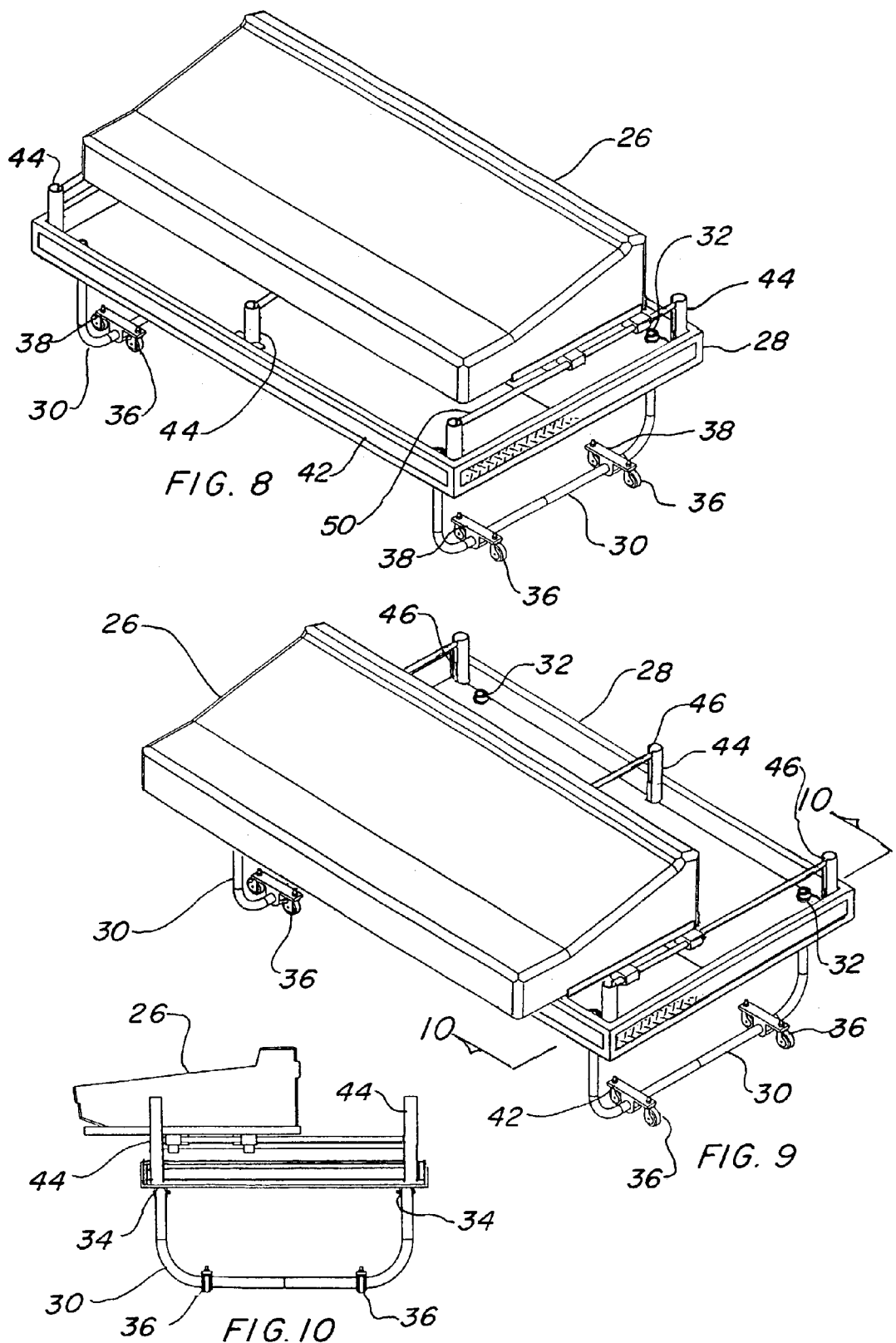

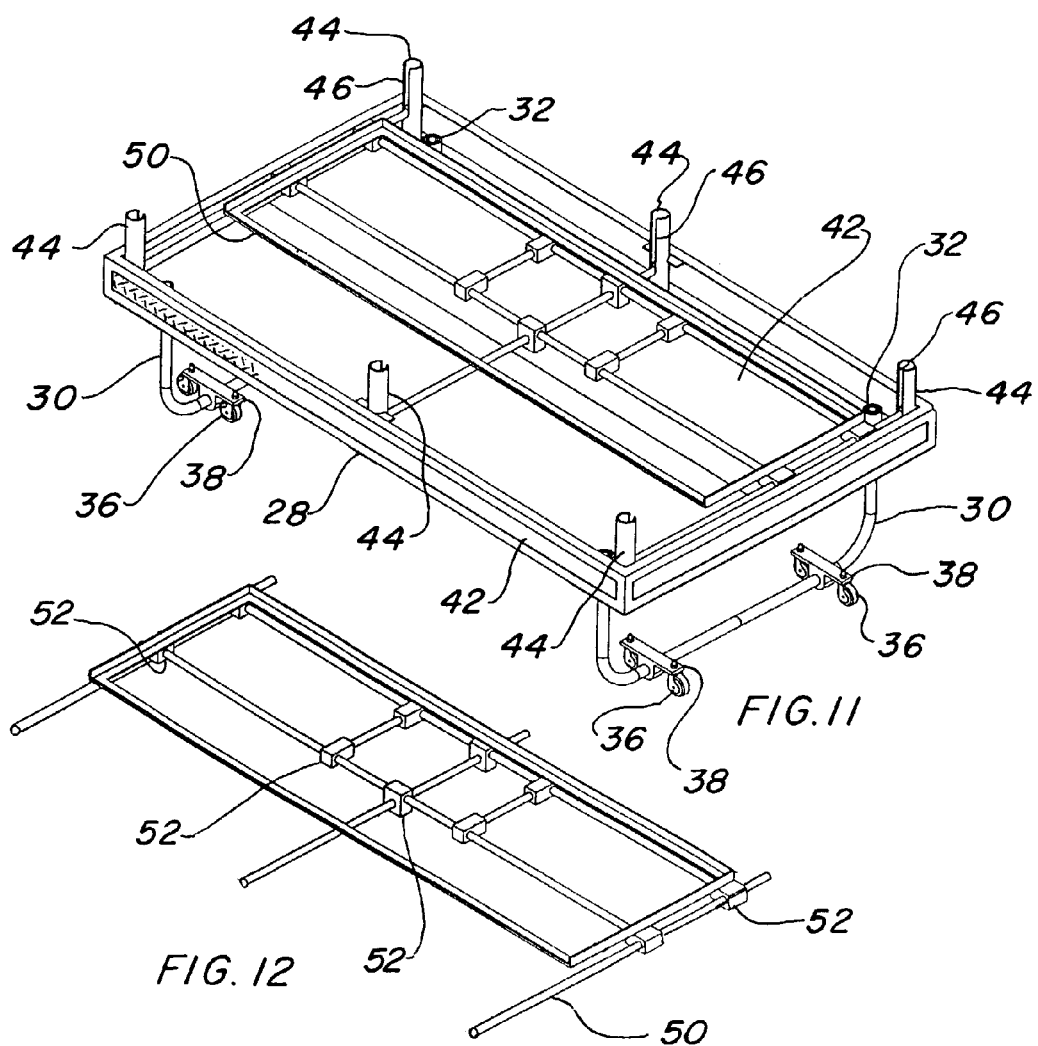
FIG. 11
FIG. 12
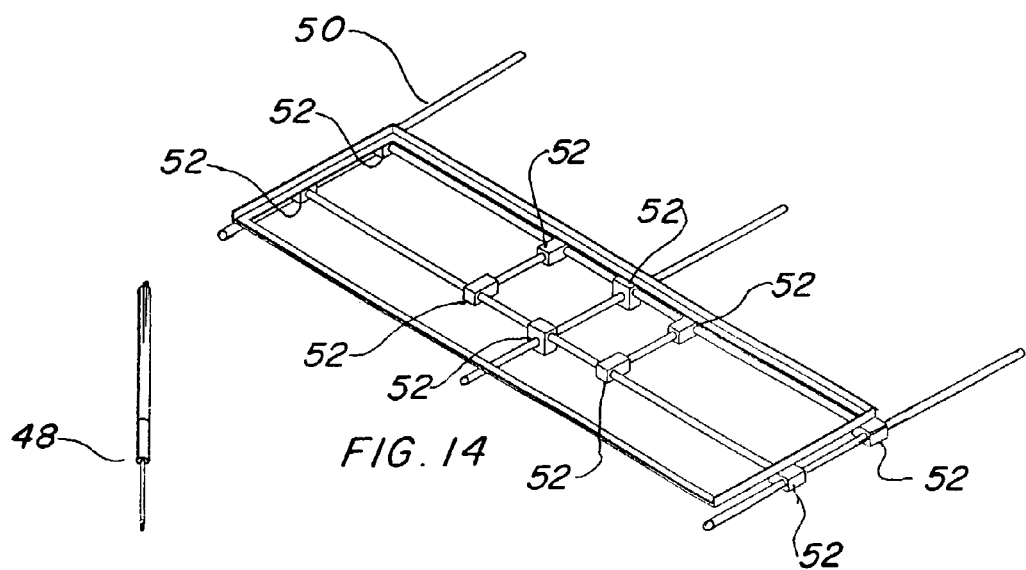
FIG. 13
FIG. 14

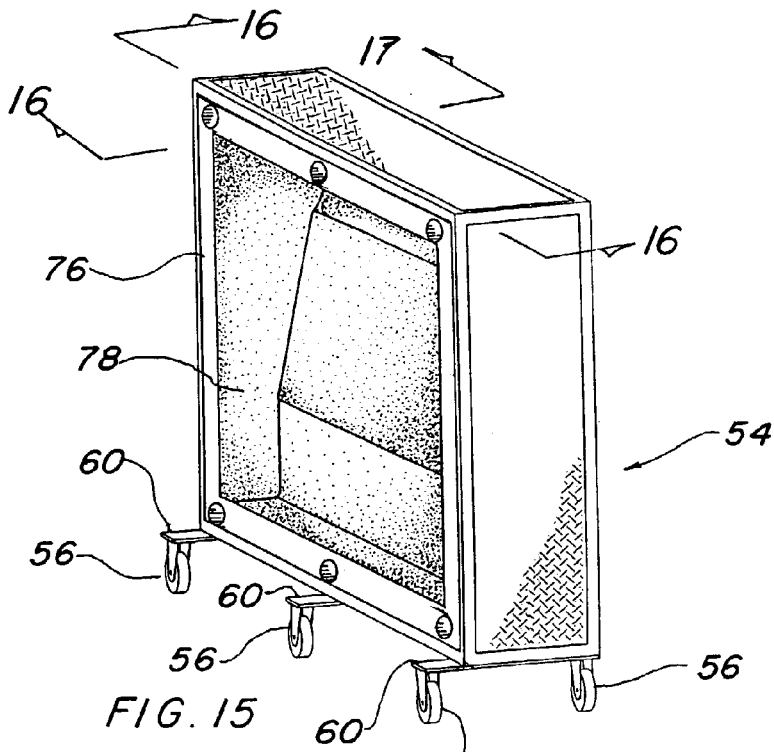
FIG. 15
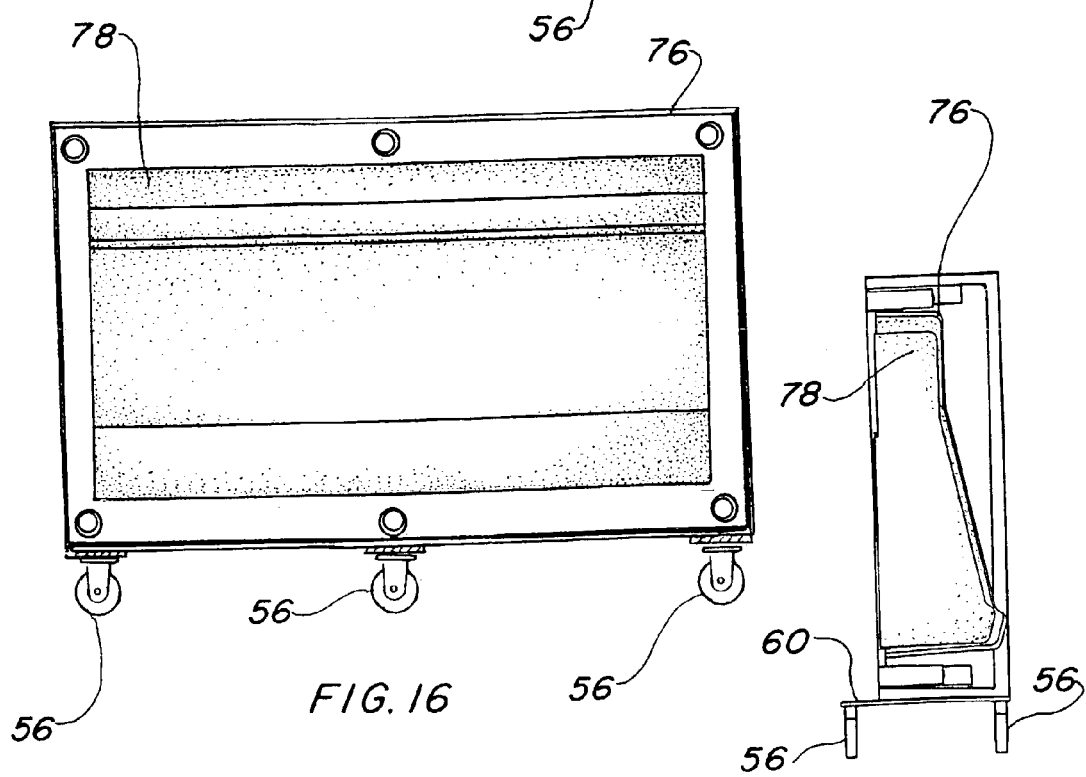
FIG. 16
FIG. 17

AUDIO MIXING CONSOLE FLIGHT CASE

TECHNICAL FIELD

The present invention generally pertains to equipment shipping cases and more specifically to a combined flight case for both shipping and supporting an audio mixing console.

BACKGROUND ART

Previously, audio mixing consoles that are used by sound engineers for performances where sound amplification and enhancement is required, and particularly where large audiences are evolved, were shipped in complex wooden crates or containers. Once all the equipment used during the performance arrives at the venue, the audio mixing console is removed typically by four or five persons and set up at a convenient location. The shipping container is normally stored separately until the performance is completed, the equipment is then replaced in the container by the four or five persons and shipped to the next venue or stored.

An audio mixing console is a fragile and expensive piece of electronic equipment, therefore it is imperative that significant care is taken in its handling and transportation— the prior art has gone to considerable length to afford such protection. It should be noted however that the common type of container made of wood, usually a vinyl coated plywood, has its limitations and wears out quickly and is subject to damage, particularly if a fork lift is used as part of the transportation mode.

Since the prior art wooden crate or container was made and improved over the past few decades, this approach has been in conformance with standard practice, therefore no specific patents have been issued to the inventor's knowledge.

DISCLOSURE OF THE INVENTION

Music mixing consoles are a standard item that are used during the presentation of musical productions and the like. The consoles are typically housed and transported in a shipping case that is positioned on the stage by means of a fork lift.

Since it is common knowledge that fork lifts have severely damaged mixing consoles a need has arisen to produce a shipping case that would solve not only the problem of fork lift damage but improve the overall handling approach and add additional utility. Further, labor organizations have limited the control of moving equipment within the venues, which results in the shipper or owner having no influence or authority during part of the transportation and setup.

The primary object of the invention is to preclude the use of fork lifts by not using fork lift slots and adding permanently-attached casters, which promotes moving the case by hand, which is convenient, and to load and unload with available manpower. The invention is designed to be loaded and shipped on its side, with the casters strategically located to permit the flight case to traverse ramps easily and be manually rolled over on legs that are easily retracted and positively locked in position.

An important object of the invention is that the flight case is made almost entirely of aluminum which is almost one third the weight of a conventional wood case. Additionally, the aluminum structure itself provides strength and robust construction as well as producing an attractive appearance.

A fiberglass inner protective liner shell safeguards a mixing console that is stored within the case.

Another object of the invention allows air circulation under and around the mixing console when the console is elevated and pulled forward into a cantilevered position. This object is important as considerable heat is generated within the console when in use and life expectancy and reliability are affected by excessive heat.

Still another object of the invention permits storage of cables, pigtails, connectors and snakes that are used with the mixing console, as well as providing space for other effects. This feature is important to a sound engineer using the console, as some of the cabling hook up may be left in place, thus shortening the time required to set up at a new venue.

Another object is that the main platform is positioned horizontally on a pair of legs. The legs have casters to finally situate the console and include swivel locks and brakes. These casters have another use as they are located on yokes that rotate in orientation when the case is shipped on its side with the legs retracted. The casters protect the side of the case as it rests against a wall or other shipping containers.

Yet another object of the invention is the automatic elevating of the console without having to manually lift the console to a raised position. Delrin blocks permit easy sliding of the console to the front thus providing leg room for the sound engineer; yet the sub frame holding the equipment is designed to stay in place without superfluous movement. Further, no modification or tie down to the console is required and any type of amplifier or other similar electronic equipment may be stored within the flight case with equal ease.

A further object of the invention is that the gas springs may be easily obtained and replaced in the field. The gas springs are completely accessible to the public as well as being in common usage, and are in stock in various hardware distributors throughout the country.

A final object of the invention is that the console never leaves the shipping case, thereby affording complete and constant protection. Further, two persons can easily lift the cover, turn it on its side and roll it on the swivel casters to a convientelly located storage facility.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the flight case in the preferred embodiment resting on casters positioned on a removable top for loading onto a transportation vehicle.

FIG. 2 is a cut away side view of a trailer showing the flight case partially unloaded and ready to be manually tilted downward onto a ramp.

FIG. 3 is a cut away side view of a trailer showing the flight case partially unloaded and resting on a loading ramp.

FIG. 4 is a partial isometric view of the flight case in the preferred embodiment with the legs folded outward ready to be rolled over into a horizontal position.

FIG. 5 is an end view of the flight case with the legs extended and manually tilted, with the legs and casters touching the floor, ready to be rolled over on the radiused legs into a horizontal position.

FIG. 6 is a partial isometric view of the flight case in the preferred embodiment, in the horizontal position resting on the leg casters.

FIG. 7 is a partial isometric view of the flight case in the preferred embodiment, in the horizontal position resting on the leg casters with the console and top raised ready for manual removal.

FIG. 8 is a partial isometric view of the flight case in the preferred embodiment, in the horizontal position resting on the leg casters with the top removed exposing the audio mixing console.

FIG. 9 is a partial isometric view of the flight case in the preferred embodiment, in the horizontal position resting on the leg casters with the top removed and the audio mixing console slid outwardly into the operating position.

FIG. 10 is a cross-sectional view taken along lines 10—10 of FIG. 9.

FIG. 11 is a partial isometric view of the main platform frame of the flight case in the preferred embodiment, with the sub frame resting in a lowered position with the gas springs compressed, replicating the location of the sub frame as if the audio mixing console were installed and the top was in place ready for shipment.

FIG. 12 is a partial isometric view of the sub frame in its shipping position.

FIG. 13 is a partial side isometric view of one of the gas springs completely removed from the invention for clarity.

FIG. 14 is a partial isometric view of the sub frame in its outward-extended position as if the audio mixing console was in place ready for operation.

FIG. 15 is a partial isometric view of the removable top resting on its casters ready for storage away from the remainder of the flight case such as when the console is in use.

FIG. 16 is a cross-sectional view taken along lines 16—16 of FIG. 15.

FIG. 17 is a cross-sectional view taken along lines 17—17 of FIG. 15.

BEST MODE FOR CARRYING OUT THE INVENTION

Figure 18:
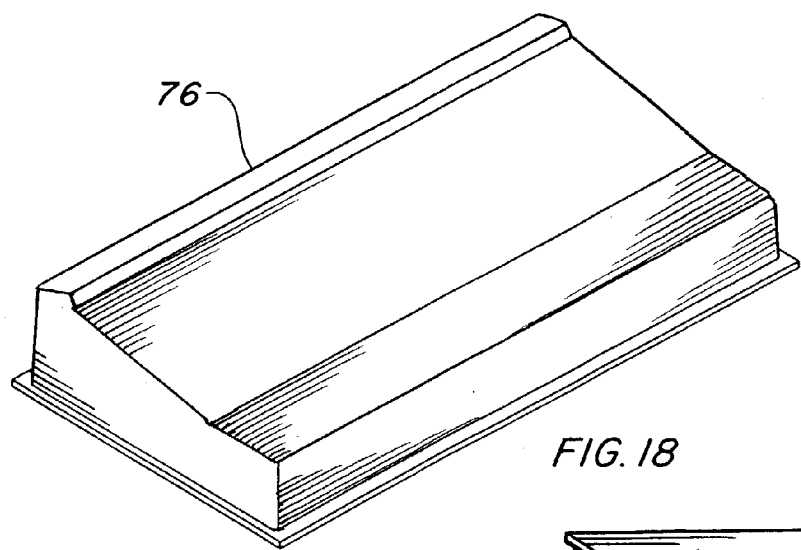
FIG. 18 is a partial isometric view of the fiberglass inner protective liner shell completely removed from the invention for clarity.
Figure 19:
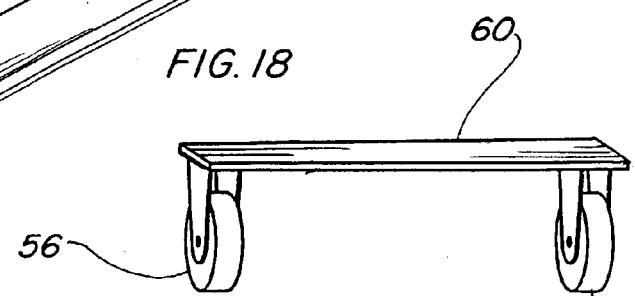
FIG. 19 is a partial isometric view of one of the top caster assemblies completely removed from the invention for clarity.
Figure 20:
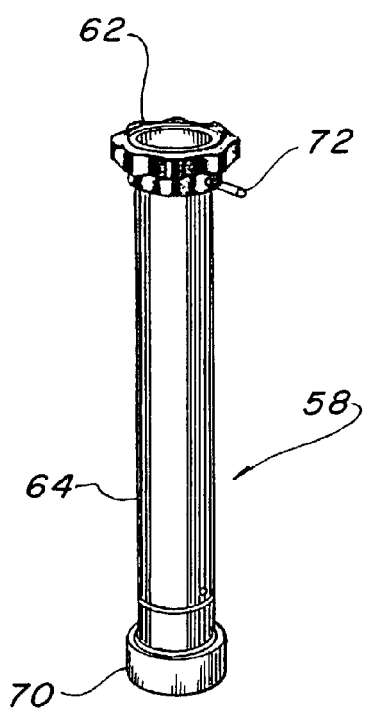
FIG. 20 is a partial isometric view of one of the top locking mechanisms completely removed from the invention for clarity.

The best mode for carrying out the invention is presented in terms of a preferred embodiment for a flight case 24 that is used for both shipping and supporting an audio mixing console 26 or the like. The preferred embodiment of the flight case 24, as shown in FIGS. 1 through 22, is comprised of a main platform frame 28 that has sufficient structural integrity to allow the console 26 to be shipped by air, by road or by any other conventional means.

The main platform frame 28, as illustrated in FIGS. 1 through 11, is fabricated with a structural aluminum angle weldment casing covered with separate panels of aluminum diamond plate replaceable skins. This type of construction is extremely durable with ¼ inch (0.635 cm) thick extruded aluminum angles welded at the corners and preferably 0.062 inch (0.158 cm) thick aluminum diamond plate skins. The outside panels or skins are attached to the angled framework with removable fasteners such as capscrews and nuts, or self-tapping screws or the like, thus permitting replacement in the event of damage.

A pair of collapsible legs 30 are arcuately attached to the main platform frame 28, as illustrated in FIGS. 1, 4–10 and 11. Each of the legs 30 is made of round aluminum pipe or tubing and are formed into a U-shape as shown, thereby permitting the frame 28 to be tilted easily by hand, as depicted in FIG. 5, as the radius is designed to permit a smooth rolling action. A plurality of receptacles 32 are integrally attached by welding into the frame 28 and each includes a pivot joint 34, shown best in FIGS. 1 and 4. The receptacles 32 are configured to additionally provide the collapsible legs 30 with a positive lock, which permits the legs 30 to slide into the receptacles 32 when extended, thus providing stability and rigidity.

Each leg 30 includes a plurality of reversible swivel casters 36 that are affixed to a yoke 38 for positioning and protecting the flight case 24. When the flight case 24 is positioned on its side for transportation, the casters 36 are faced outward and when the flight case 24 is positioned horizontally, the casters 36 may be rotated to face downward for resting on a hard surface. In the preferred embodiment, the yoke 38 has two casters 36 positioned one on each distal end, as illustrated in FIGS. 1 and 4–11, and is designed to rotate on the round outside diameter of the leg 30.

The casters 36 attached to the yoke 38 are partially inverted by manually rotating the entire yoke 36 approximately 45 degrees relative to the legs 30. This rotation is easily accomplished by the use of an adjustable collar that is integrally formed within the yoke 36 and which may be tightened or loosened with a set screw rotated by an Allen wrench to maintain optimum resistance. Each opposed outside corner caster 36 includes a swivel lock and brake for securing the flight case in place when it has been positioned as required. It should be noted that the preferred number of casters 36 used on the flight case 24 is a pair on each yoke 38, for four yokes 38, which comprises a total of eight casters 36 required.

The main platform frame 28 includes a plurality of spring clips 40 that are attached onto one of the bottom frame panels 42 for holding the legs 30 in a collapsed position against the surface of bottom frame panel 42.

A number of upright sockets 44, preferably six, are welded onto the main platform frame 24 on the outer edge of the inner surface of the frame 28. The sockets 44 protrude upward when the frame 28 is positioned horizontally, as shown best in FIG. 11. Each upright socket 44 is made of an aluminum pipe or tube and includes a slot 46 facing the inside of the frame 28.

A gas spring 48 is disposed within each of the upright sockets 44 and each are attached to the frame 24 on one end. The gas spring 48 consists of a piston and piston rod in a sealed cylinder which contains pressurized gas. The piston has an orifice that allows the gas to transfer from one side of the piston to the other. Gas pressure pushes the rod outward, thereby allowing the gas to act as an ordinary compression spring, only in a slower linear movement.

A positional console sub frame 50 that is located inside main platform frame 28 contiguously engages the gas springs 48 within the sockets 44. The slots 46 in the upright sockets 44 receive the distal ends of the sub frame 50 and permit the sub frame 50 to slide freely in a vertical direction as urged by extension of the gas springs 48 in the sockets 44. The sub frame 50 is configured to receive the audio mixing console 26, as depicted in FIGS. 8 through 10, with the gas springs 48 rated from between 25 lbs (11.35 kg) and 100 lbs (45.4 kg) which is more than the weight of the console 26 when mounted on the sub frame 50 which constantly forces the console 26 to be in an upstanding position. The sub frame 50 is configured to slide the audio mixing console 26 outside of the frame 28, thus forming a cantilevered shelf which permits a sound engineer to sit easily in front of the console 26 with ample leg room. FIG. 10 illustrates the console 26 pulled out into the shelf position.

A number of sliders 52 made typically of a thermoplastic, are slideably positioned over the outside diameter of the aluminum tubing or piping which make up the sub frame 50. FIG. 11 is a partial isometric view of the main platform frame 28 of the flight case 24, with the sub frame 50 resting in a lowered position with the gas springs compressed, replicating the location of the sub frame 50 when an audio mixing console 26 is in place. FIG. 12 illustrates the sub frame 50 in the normal shipping position, and FIG. 14, with the sub frame 50 extended into the shelf position. From the illustrations it may be plainly visualized that the sub frame 50 is just a matrix of aluminum or steel tubes or pipes held together by the sliders 52, which are sized to fit tightly on some joints and glide easily on others to achieve the shelf sliding movement.

A removable top 54 with side casters 56 interfaces around the upright sockets 44 of the main platform frame 28 such that the top 54 is easily removed by lifting upward away from the sockets 44. The top 54 includes a plurality of locking mechanisms 58 for attaching the top 54 to the frame 28. When the legs 30 are extended and the case 24 is positioned horizontally, the locking mechanisms 58 is manually rotated, which elevates both the sub frame 50 and the top 54 in concert. This upward movement is caused by the extendable force of the gas springs 48, which allows the top to be manually removed. Thus, leaving the sub frame 50 for supporting the audio mixing console 26 which is exposed ready for use after attaching the necessary electrical cables and connectors.

The removable top side casters 56 are preferably of the swivel-locking caster type and are disposed on one lateral side of the top 54, thereby permitting manual transportation of the top 54 for storage at a venue and loading and shipping of the entire flight case 24. The side casters 56 are shown mounted on a caster support plate 60 and removed from the bottom of the case 24 in FIG. 19, and mounted in place in FIGS. 1–11 and 15–18.

Figure 21:
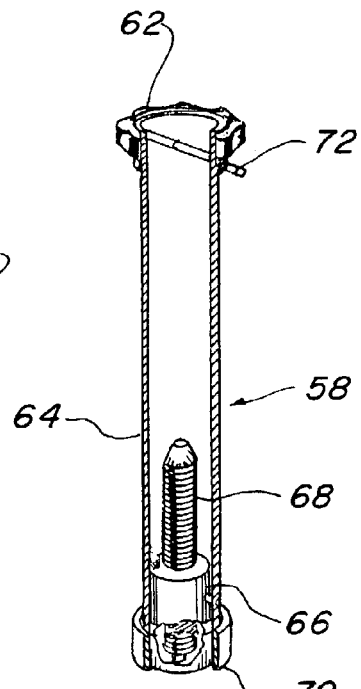
FIG. 21 is a cut away partial isometric view of one of the top locking mechanisms completely removed from the invention for clarity, illustrating the acme running thread within the mechanism.
Figure 22:
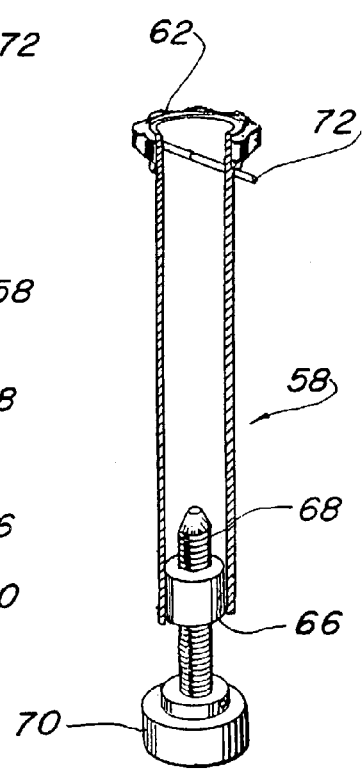
FIG. 22 is a cut away partial isometric view of one of the top locking mechanisms completely removed from the invention for clarity, illustrating the mechanism in the partially expanded, or raised, position.

The locking mechanism 58, as shown removed from the invention in FIGS. 20–23, consists of a knob 62 attached to a shaft 64 on one end and a threaded plug 66 on the other. A threaded stud 68 is attached to a base 70 which is firmly connected to the main platform frame 28. Securing means in the form of a pin 72 or the like is positioned between the knob 62 and the flight case top 54 which rotatably fastens the shaft 64 to the top 54. By rotating the knob 62 the plug 66 threadably interfaces with the stud 68, thereby moving the top 54 either up or down according to the direction of the knobs rotation. The cross-sectional views of FIGS. 21 and 22 illustrate the movement, with FIG. 21 showing the locking mechanism 58 in the fully secured position, and FIG. 22 about half-way open.

The top 54 is made of the same aluminum angle frame construction with diamond plate aluminum top panels 74 as the main platform frame 28. A fiberglass or an acetyl homopolymer inner protective liner shell 76 is disposed within the removable top 54 for shielding the audio mixing console 26 when the console is stored within the flight case 24. The protective liner shell 76 is shown in the drawings in cross section in FIGS. 16 and 17, and by itself in FIG. 18. The protective liner shell 76 includes a foam cushion 78 attached onto an inside surface to further protect the audio mixing console 26 from any exterior damage.

In handling the audio mixing console flight case 24 when the electronic equipment is stored inside and closed, the case 24 is positioned on its side and shipped in conventional transportation equipment, such as a tractor trailer 80 or truck, as illustrated in FIGS. 2 and 3. The legs 30 are retracted and the swivel caster yoke 38 is rotated to the sides such that the casters 36 rest against wall or other shipping containers. When the case 24 is offloaded it is rolled to a position where the center of gravity is still on the vehicle, as shown in FIG. 2, The case 24 is then rolled forward until it swings down and the front casters touch the ramp as shown in FIG. 3. The case 24 is then rolled into the venue and positioned in place with the legs 30 pivoted outward and locked into their receptacles 32. The locking mechanisms 58 are then manually rotated, thus causing the sub frame 50 and the top 54 to be elevated in concert by the urging of the gas springs 48, as shown in FIGS. 8 and 9, permitting the top to be removed exposing the sub frame 50 and console 26. The console 26 is then slid forward to create a shelf for the sound engineer. The top 54 is then stored by rolling on the side casters 56.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A flight case for both shipping and supporting an audio mixing console comprising:
   a) a main platform frame having sufficient structural integrity for shipping by air or by road transportation,
   b) a pair of collapsible legs arcuately attached to the main platform, each leg having a plurality of reversible swivel casters affixed thereon such that when the flight case is positioned on its side for transportation the casters face outward and when the flight case is positioned horizontally the casters may be rotated to face downward for resting on a hard surface,
   c) a plurality of upright sockets affixed within the main platform frame on an outer edge of the frame's inner surface,
   d) a plurality of gas springs disposed within the upright sockets and attached to the frame on one end,
   e) a positional console sub frame located inside main platform frame contiguously engaging the gas springs within the sockets, said sub frame configured to receive an audio mixing console, and
   f) a removable top with side casters slideably interfacing around the upright sockets of the main platform frame, said top having a plurality of locking mechanisms for attaching the top to the frame, further, when the legs are extended and the case is positioned horizontally, as the locking mechanisms are manually rotated, the sub frame and the top are elevated in concert by the extendable urging of the gas springs, such that the top may be manually removed leaving the sub frame for supporting an audio mixing console that is exposed ready for use including attaching electrical cables and connectors.

2. The flight case for shipping and supporting an audio mixing console as recited in claim 1 further wherein said main platform frame further comprises a structural aluminum angle construction covered with a plurality of aluminum diamond plate replaceable skins.

3. The flight case for shipping and supporting an audio mixing console as recited in claim 1 further comprising a plurality of receptacles integrally formed into said main platform frame wherein said collapsible legs lock into said receptacles for stability and rigidity.

4. The flight case for shipping and supporting an audio mixing console as recited in claim 1 wherein said reversible swivel casters are partially inverted by manually rotating 45 degrees relative to the legs.

5. The flight case for shipping and supporting an audio mixing console as recited in claim 1 wherein said reversible swivel casters further comprise an opposed outside corner caster having a swivel lock and brake.

6. The flight case for shipping and supporting an audio mixing console as recited in claim 1 wherein said main platform frame further comprising a plurality of spring clips attached thereon for holding the legs in a collapsed position against the frame's bottom surface.

7. The flight case for shipping and supporting an audio mixing console as recited in claim 1 wherein each upright socket having a slot therein for receiving the sub frame and permitting the sub frame to slide freely in a vertical position as urged by extension of the gas spring contained within.

8. The flight case for shipping and supporting an audio mixing console as recited in claim 1 wherein said gas springs are rated from between 25 lbs (11.35 kg) and 100 lbs (45.4 kg) more than console weight when mounted on the sub frame.

9. The flight case for shipping and supporting an audio mixing console as recited in claim 1 further comprising said sub frame configured to slide an audio mixing console resting thereon, outside of the main platform frame to form a cantilevered shelf permitting a sound engineer to sit easily in front thereof with ample leg room.

10. The flight case for shipping and supporting an audio mixing console as recited in claim 1 wherein said sub frame further comprising a plurality of sliders made of a thermoplastic.

11. The flight case for shipping and supporting an audio mixing console as recited in claim 1 wherein said removable top side casters comprise a plurality of swivel-locking casters disposed on one lateral side of the top, thus permitting manual transportation of the top for storage at a venue and loading and shipping of the entire flight case.

12. The flight case for shipping and supporting an audio mixing console as recited in claim 1 wherein said locking mechanism further comprises a knob attached to a shaft on one end and an acme threaded plug on the other, further, an acme threaded stud attached to a base is connected to the main platform frame, securing means positioned between the knob and the flight case top rotatably fasten the shaft to the top, such that rotating the knob interfaces the plug with the stud, thereby moving the top up or down according to the direction of knob rotation.

13. The flight case for shipping and supporting an audio mixing console as recited in claim 1 wherein said top further comprising an inner protective liner shell disposed within the removable top for shielding an audio mixing console stored within the flight case.

14. The flight case for shipping and supporting an audio mixing console as recited in claim 13 wherein said inner protective liner shell is made of fiberglass or an acetyl homopolymer.

15. The flight case for shipping and supporting an audio mixing console as recited in claim 13 further comprising a foam cushion attached onto said fiberglass inner protective liner's inside surface.

16. A flight case for both shipping and supporting an audio mixing console comprising:
   a) a main platform frame,
   b) at least a pair of collapsible legs having casters, said legs rotatably attached to said main platform,
   c) a plurality of upright sockets attached within the main platform frame,
   d) a plurality of gas springs disposed within the upright sockets,
   e) a sub frame located inside said frame contiguously engaging the gas springs within the sockets, said sub frame configured to receive an audio mixing console, and
   f) a removable top slideably interfacing over the upright sockets, said top having a plurality of locking mechanisms for attaching the top to the frame, further, when the case is positioned horizontally and as the locking mechanisms are manually rotated, the sub frame and the top are elevated in concert by the urging of the gas springs, thus permitting the top to be removed and the sub frame and console exposed.

17. A flight case for both shipping and supporting an audio mixing console comprising:
   a) a platform frame having collapsible legs with casters, and a plurality of gas spring containing upright sockets,
   b) a sub frame located inside said frame contiguously engaging the gas springs within the sockets, said sub frame configured to receive an audio mixing console, and
   c) a removable top having locking mechanisms slideably interfacing over the upright sockets, further, when the case is positioned horizontally and when the locking mechanisms are actuated, the sub frame and the top are elevated in concert by the urging of the gas springs permitting the top to be removed exposing the sub frame and console.

* * * * *